(12) United States Patent
Khureim Castiglioni et al.

(10) Patent No.: US 11,424,818 B2
(45) Date of Patent: Aug. 23, 2022

(54) SATELLITE-BASED DATA COLLECTION METHOD

(71) Applicant: THALES, Courbevoie (FR)

(72) Inventors: Shadi Khureim Castiglioni, Toulouse (FR); Nicolas Van Wambeke, Toulouse (FR); Christian Peyrotte, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/318,809

(22) Filed: May 12, 2021

(65) Prior Publication Data

US 2021/0359750 A1    Nov. 18, 2021

(30) Foreign Application Priority Data

May 15, 2020    (FR) ...................................... 2004875

(51) Int. Cl.
*H04B 7/185*    (2006.01)
*H04B 1/69*    (2011.01)
(52) U.S. Cl.
CPC ........... *H04B 7/18513* (2013.01); *H04B 1/69* (2013.01); *H04B 2001/6904* (2013.01)

(58) Field of Classification Search
None
See application file for complete search history.

(56) References Cited

U.S. PATENT DOCUMENTS

2008/0191863 A1    8/2008    Boling et al.
2009/0121931 A1    5/2009    Katz

FOREIGN PATENT DOCUMENTS

CN    110474971 A    11/2019
EP    3 185 032 A1    6/2017

*Primary Examiner* — Walter J Divito
(74) *Attorney, Agent, or Firm* — BakerHostetler (57) ABSTRACT

A radiofrequency system and to a data collection method includes at least one beacon, and at least one space platform or airborne platform with an adaptable antenna beam. The method comprises: a step wherein the platform emits an activation signal with a low directional antenna beam, each beacon responding with an access request, a step of generating a table comprising, for each item of equipment, a duration of visibility, a frequency band and a transmission duration, a step of defining a control plan scheduling the sequencing of the transmissions associated with directional antenna beam configurations of the platform, a step comprising: transmitting the times at which they are able to transmit to the items of equipment that emitted an access request, orienting the antenna beam of the platform according to the control plan, sending and storing the data.

12 Claims, 9 Drawing Sheets

SATELLITE-BASED DATA COLLECTION METHOD

CROSS-REFERENCE TO RELATED APPLICATIONS

This application claims priority to foreign French patent application No. FR 2004875, filed on May 15, 2020, the disclosure of which is incorporated by reference in its entirety.

FIELD OF THE INVENTION

The invention lies in the field of collecting data in communication systems in which the entities to be put in communication are not necessarily within radio visibility of one another, and more particularly satellite-based data collection systems for connected objects. It aims to define a method allowing the system capacity and the spectral efficiency of these transmission systems to be optimized.

BACKGROUND

The invention lies in the context of the space platform-based or airborne platform-based collection of data transmitted by beacons, for example connected objects, which are generally autonomous and do not necessarily have directional antennas, to a central item of equipment responsible for processing the data and with which they are not necessarily within radio visibility. This primarily involves low-power and very-low-throughput communications performed by autonomous devices having little data to transmit. Possible applications include for example beacons for tracking the displacement of vehicles, animals, people, buoys for modelling currents, and sensors of all kinds.

One of the ways of collecting the data from the beacons is that of using satellite networks. Standard satellite-based communication methods (such as for example DVB-S, acronym for Digital Video Broadcasting—Satellite) are designed to offer services in real time and for large amounts of data. They are therefore overdimensioned with respect to the needs of connected objects, and implement complex processing operations that are barely aligned with the needs for low consumption and the low computing powers of devices on the ground.

For this reason, in the prior art, connected objects generally have a geolocation means (such as a GPS (Global Positioning System) beacon) and ephemerides means allowing them to ascertain, with reasonable accuracy, when they are flown over by a satellite. When this is the case and they have data to transmit, they send said data to the satellite, which collects said data and delivers them to specific items of ground equipment. The system therefore depends on the quality of the ephemerides. Furthermore, depending on the constellation, multiple satellites may receive the same information at the same time (case of multiple satellites within visibility). If the system does not provide for this, there may then be duplicated information on the various satellites of a constellation, this constituting a waste of resources.

In order to limit interference between the transmissions of the beacons, existing systems for connected objects generally make use of distributed mechanisms based on stochastic processes to manage access to the radio resource ("Aloha" or "Slotted Aloha" contention mechanisms). However, this approach has the effect of limiting the extensibility of the systems, since the capacity of the system collapses past a certain threshold. This is the phenomenon known as "congestion collapse", which means that the capacity of these systems is only 15 to 40% of the theoretical capacity of the channel. Managing the band through contention access operations is therefore barely compatible with the need for highly sustained connectivity.

In response to the congestion problems, it is known to use interference cancellation/repetition-based access mechanisms, such as CRDSA (acronym for Contention Resolution Diversity Slotted ALOHA), MuSCA (acronym for Multi-Slot Coded ALOHA), or MARSALA (acronym for Multi-replicA decoding using correlation baSed LocAlisAtion). It is also known to use spread-spectrum transmission mechanisms, code spreading providing isolation in relation to the interference. However, spread-spectrum communication throughputs are poor. Furthermore, these solutions do not make it possible to prioritize terminals over one another and to control access to the resources. Terminals without a contract may thus lower the overall capacity of the system. They also do not allow the throughput of the transmissions to be adapted to the operating conditions.

SUMMARY OF THE INVENTION

The invention describes a method for optimizing capacity and spectral efficiency for satellite-based data collection systems, falling within the field of multiple access with interference resolution so as to maximize the capacity of the system, and without limiting the extensibility of the system. The proposed method may also make it possible to prioritize transmissions, to control access, and to adapt the transmission throughputs as best possible. It is therefore particularly suitable for satellite-based transmissions with connected objects emitting at low power.

To this end, the present invention describes a data collection method for collecting data in a radiofrequency communication system, comprising:
  at least one space platform or airborne platform that knows its position, configured so as to transmit with an antenna beam whose width and orientation are adaptable and comprising data storage means, and
  at least one beacon configured so as to acquire data, the position of each beacon being known to at least one of the beacon in question and the space platform or airborne platform.

The method is characterized in that it comprises:
  a first step in which the platform emits an activation signal with a low directional antenna beam, to which each beacon wishing to transmit data responds with an access request comprising an identifier,
  a second step of generating a table comprising, for each item of equipment that transmitted an access request, a duration of visibility to the transmission device, a frequency band and a transmission duration,
  a third step of defining, based on the table generated in the second step, a control plan scheduling the sequencing of the transmissions of the items of equipment that emitted an access request and associating them with directional antenna beam configurations of the platform, and
  a fourth step comprising:
  transmitting, to the items of equipment that emitted an access request, an item of information allowing them to ascertain the times at which they are able to transmit, and
  orienting a directional antenna beam from the platform to one or more beacons, sending data from said one or more beacons to the platform, and storing the data received by the platform, in the order and according to the antenna beam configurations defined by the control plan.

In one embodiment, the method furthermore comprises at least one ground data collection station, wherein:
- the first step furthermore comprises transmission of an access request comprising an identifier by each ground station receiving the activation signal, and
- when a ground station transmits an access request during the first step of the method, the fourth step furthermore comprises transferring the data stored by the platform to the ground station with a directional antenna beam.

In another embodiment, the data collection method furthermore comprises at least one ground data collection station, the method furthermore comprising a step of transmitting the data stored by the platform to the ground station via a dedicated link.

In one embodiment of the method according to the invention, the access request emitted by a beacon in the first step furthermore comprises a position of the beacon and at least one of: an amount of data to be transmitted, a timestamp associated with the position of the beacon, a priority level, a history of the positions of the beacon and an acknowledgement mechanism indicator.

Advantageously, the access request emitted in the first step is modulated using a code-division spread-spectrum technique.

In one embodiment of the method according to the invention, the table generated in the second step furthermore comprises at least one of: a priority level, a velocity vector, an amount of data to be transmitted, a modulation and coding scheme, a throughput and an acknowledgement mechanism indicator.

In one embodiment of the method according to the invention, the control plan generated in the third step furthermore comprises at least one of: a number of items of equipment associated with each directional antenna beam configuration, an order of service, an allocated duration, an allocated frequency band, a modulation and coding scheme, and an acknowledgement mechanism indicator.

In one embodiment of the method according to the invention, the first three steps are repeated sequentially and the fourth step is implemented in parallel with the first three steps.

In one embodiment of the method according to the invention, the four steps are repeated sequentially.

The invention also describes a radiofrequency communication system comprising:
- at least one space platform or airborne platform that knows its position, configured so as to transmit with an antenna beam whose width and orientation are adaptable and comprising data storage means. The elements of the communication system being configured so as to implement a data collection method according to the invention, and
- at least one beacon configured so as to acquire data, the position of each beacon being known to at least one of said beacon and the space platform or airborne platform.

In one embodiment, the system furthermore comprises at least one ground data collection station.

Advantageously, the platform comprises an active antenna or a mechanically orientable antenna whose beam width is adjustable or a first antenna with a low directional beam and a second antenna with a mechanically orientable directional beam.

BRIEF DESCRIPTION OF THE DRAWINGS

The invention will be better understood and other features, details and advantages will become more clearly apparent from reading the following non-limiting description, and by virtue of the following appended figures, given by way of example, among which:

FIG. 2b shows the main phases of one embodiment of the data collection method according to the invention, continuing from FIG. 2a;

FIG. 4b uses one example to illustrate the continuation of the sequence of the fourth phase of one embodiment of the method according to the invention, continuing from FIG. 4a;

FIG. 6b uses one example to illustrate the continuation of the sequence of the fourth phase of one embodiment of the method according to the invention, continuing from FIG. 6a;

Identical references may be used in different figures when they denote identical or comparable elements.

DETAILED DESCRIPTION

The invention relates to a method for a satellite-based data collection system that is particularly suitable for transmissions performed by connected objects such as IoT (acronym for Internet of Things) beacons. However, it is not limited to connected objects, and may apply identically to any radiofrequency emitter (or beacon) for which the transmission standards do not correspond to the operating constraints.

Likewise, although the invention is particularly suitable for satellite-based transmissions, in particular involving LEO (acronym for Low Earth Orbit) or MEO (acronym for Medium Earth Orbit) satellites that may cover the Earth several times a day, it also applies in a completely identical manner when the item of equipment intended to collect the data is an airborne platform, such as for example an aeroplane, a drone or a balloon. For the sake of simplicity, the remainder of the description will however assimilate the platform recovering the data transmitted by the beacons to a satellite.

Figure 1:
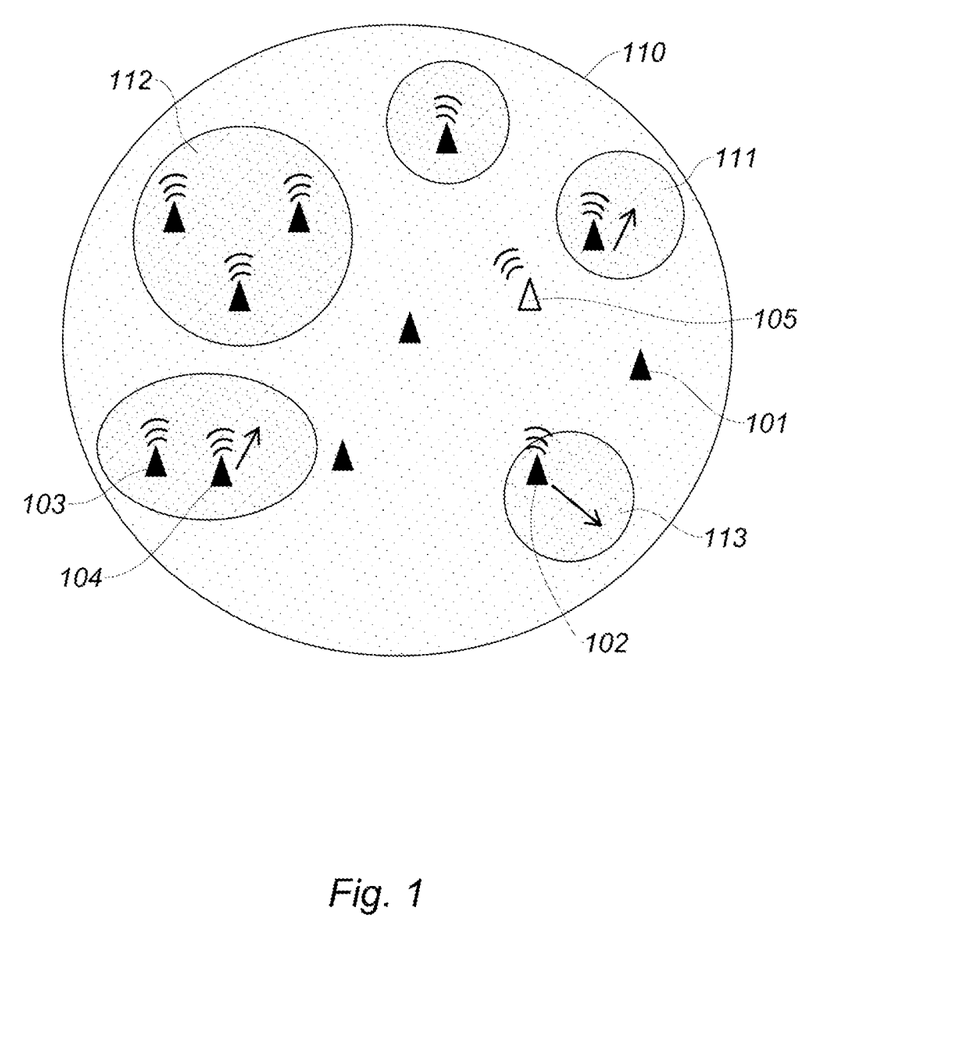
FIG. 1 illustrates the operating context into which the data collection method according to the invention falls.

FIG. 1 illustrates the operating context into which the data collection method according to the invention falls. This is a communication system involving one or more moving satellites and at least one beacon, or connected object, positioned on the ground or at low altitude and configured so as to acquire any data and transmit them to a satellite. The position of the beacons is known, either because they have fixed positions or because they are equipped with a geolocation means, for example a GPS receiver. The satellite knows its position and its velocity vector. It has one or more antennas allowing it to adapt the width and the orientation of its antenna beam. According to one embodiment, the antenna of the satellite is an active antenna for which applying a constraint to the amplitude and the phase of the various elements makes it possible to adapt the size of the beam (and therefore the gain of the antenna) and its direction. According to another embodiment, the antenna of the satellite is a mechanically orientable antenna whose beam width is adjustable. According to another embodiment, the satellite has two antennas: a first antenna having a low directional radiation pattern, and a second antenna having a directional radiation pattern whose direction is mechanically adjustable. The antenna with a low directional radiation pattern is used to cover the widest possible geographical area, typically of the order of a few hundred to a few thousand kilometres for a satellite depending on its altitude, or of the order of a few kilometres for an airborne platform. The antenna with a directional radiation pattern is used to cover a narrower geographical area, ideally of the order of a few tens of kilometres to a few hundred kilometres for a satellite depending on its altitude, or of a few tens of metres for an airborne platform, but with a higher gain. Advantageously, the satellite may have multiple (active or mechanical) directional antennas allowing it to parallelize the processing operations.

In FIG. 1, the references 101 to 105 represent various beacons in an operating environment. Some beacons may be static (beacons 101, 103 and 105), while others may be mobile (beacon 102 and 104). Some of them may have data to transmit (102, 103, 104 and 105), and others may not (101). Lastly, some beacons may belong to the communication system (beacons 101 to 104), while others are not part thereof (105).

According to the embodiment, one or more of the transmission parameters of the beacons (modulation and coding scheme, size of the data packets, frequency bands) may be fixed or dynamically adjustable.

The reference 110 denotes the geographical area covered when the satellite uses a low directional antenna beam. The references 111, 112 and 113 denote various geographical areas covered when the satellite uses a directional antenna beam whose direction is steerable.

The method according to the invention makes it possible to improve the performance of existing data collection systems by combining access on demand to the frequency resources and a control plan for the beamforming and the data transfer. It thus makes it possible to limit or even stop collisions between communications performed by the beacons, to optimize the link budget, the transmission throughput and the duration of visibility of the terminals.

According to one embodiment, the device recovering the data transmitted by the beacons is configured so as to retain these data in memory. This embodiment is suitable for example in the case of an airborne platform having a limited mission duration. The data are recovered at the end of the mission in order to be utilized. In another embodiment, the data acquired from the beacons are transferred to a ground station. The ground station may have means for utilizing the data, or be connected, via a conventional data link, to a device for utilizing these data. This embodiment is advantageous when the device receiving the data from the beacons is a satellite, or when the latency time of the transmissions is significant. The data may be transmitted to the ground station in a frequency band separate from the one used by the beacons. In this case, it may be implemented independently of the data collection method. As an alternative, the transmission may form an integral part of the data collection method according to the invention, and be integrated into the process of receiving the data emitted by the beacons.

Figure 2A:
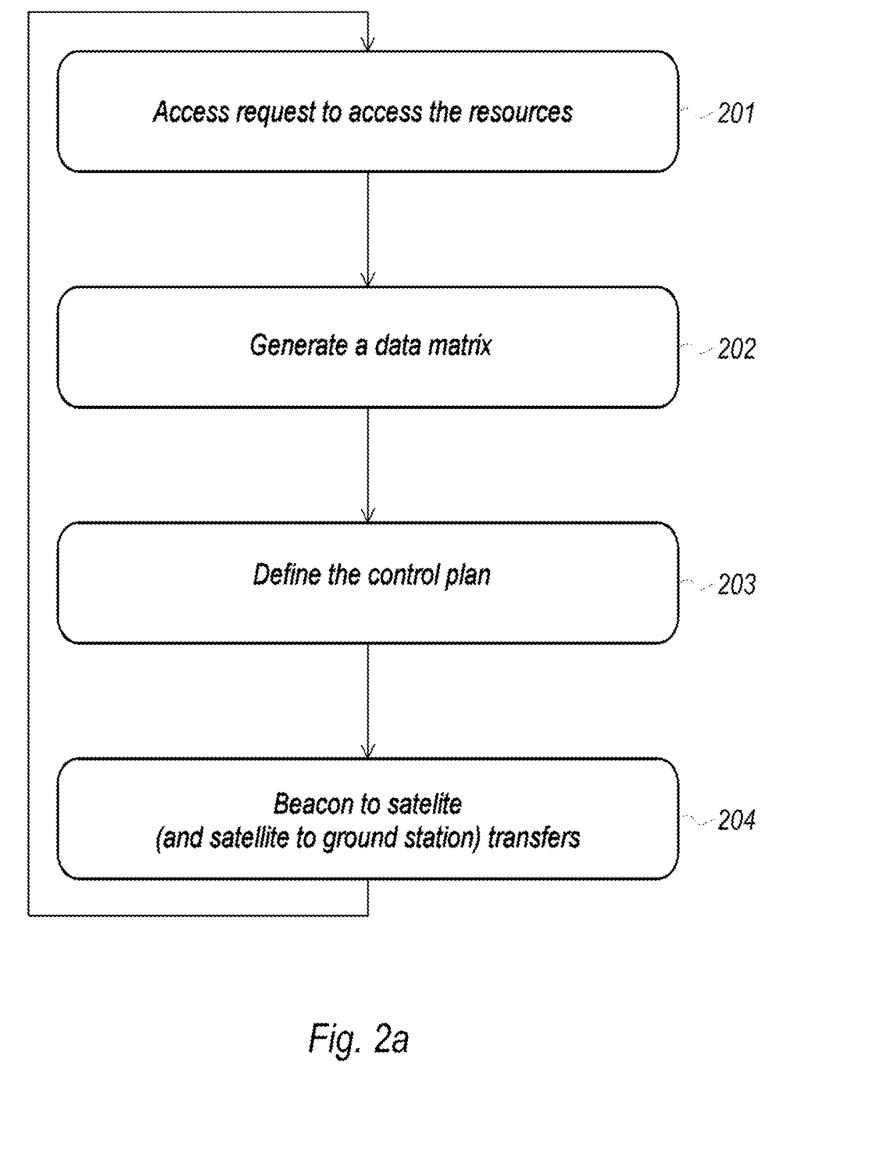
FIG. 2a shows the sequence of the steps of one embodiment of the data collection method according to the invention.

FIG. 2a shows the sequence of the steps of one embodiment of the data collection method according to the invention. The method according to the invention comprises four main phases:

a first phase 201 in which the beacons having data to transmit emit an access request to access the resources, a second phase 202 in which the transmitted needs are analysed in order to determine various parameters, in particular the period of visibility between the satellite and the various beacons, a third phase 203 in which a control plan is established that describes the sequencing of the emissions of the various beacons, as well as the associated antenna configurations, a fourth phase 204 of transmission of the data by the beacons to the satellite and of storing these data in the satellite.

When the data collection system involves a ground station whose transmissions are integrated into the transmissions of the beacons, the first phase is also performed by the ground stations, while the second and third phases take into account the presence of a ground station for generating the control plan. Lastly, the fourth phase comprises transmitting the stored data to the ground station.

In the embodiment shown in FIG. 2a, the four steps 201 to 204 of the method are performed sequentially. Phase 4 may be of variable duration, dimensioned dynamically with respect to the amount of data to be transmitted and to the transmission throughput, or of fixed duration, thereby making it possible to control the total duration of the method and the refresh frequency for the generation of the control plan. In this embodiment, just one frequency band is then required to execute all of the steps.

Figure 2B:
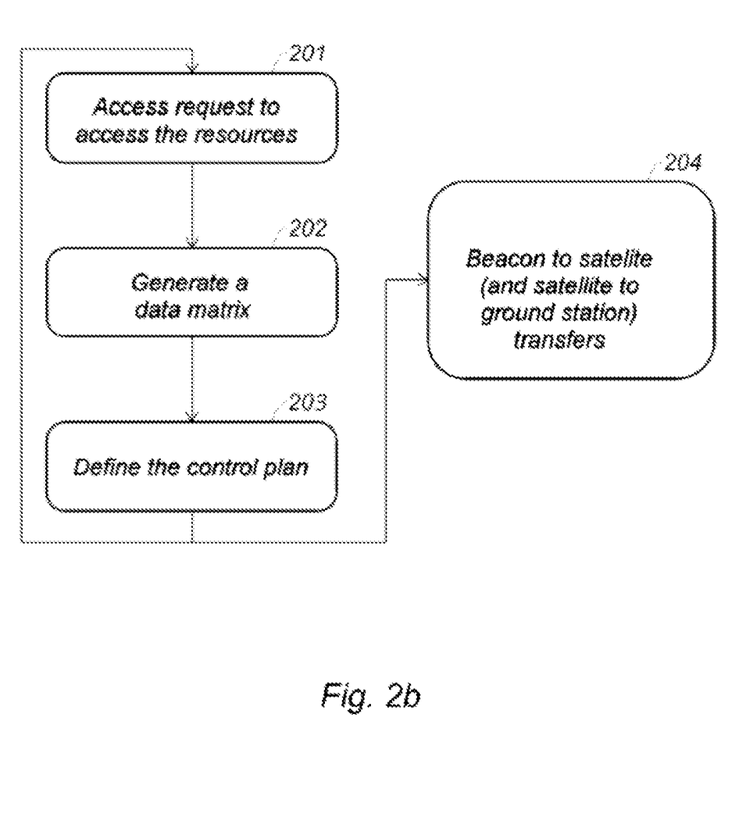

According to another embodiment, shown in FIG. 2b, the first three steps of the method 201 to 203 are repeated at regular intervals. The fourth step 204 is executed in parallel, based on the control plan computed in the previous iteration of the first three steps. This embodiment requires using at least two antennas having different beam widths: one for step 201 and one for step 204.

FIGS. 3 to 8 illustrate, through a non-limiting example, the sequence of the various steps of the data collection method according to the invention. This example is established with respect to a complex operating case involving a ground station whose transmissions are integrated into the transmissions of the beacons. The method is applicable once the necessary changes have been made when the system does not have ground stations, or when the transmissions to the ground station take place via a dedicated link.

Figure 3:
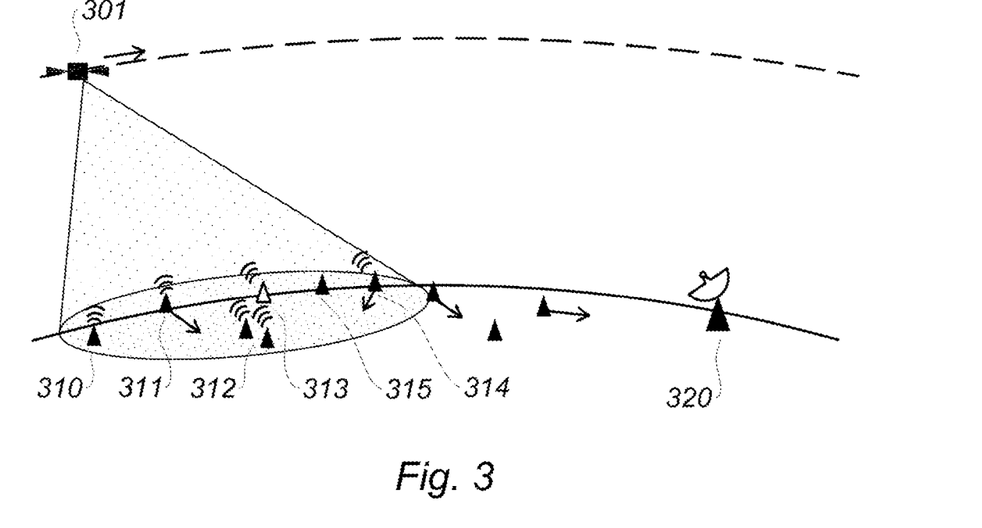
FIG. 3 uses one example to illustrate the first phase of one embodiment of the method according to the invention, continuing from FIG. 2b.

FIG. 3 corresponds to the first phase 201 of the method, during which the satellite 301 uses a low directional antenna beam so as to cover the vastest possible geographical area. In the example in FIG. 3, it is within radio visibility of the beacons 310 to 314, which have data to transmit, as well as the beacon 315, which does not have data to transmit. The satellite 301 and the beacons 311 and 314 are moving. The beacon 313 does not form part of the communication system.

In the first phase 201, the satellite sends a signal informing the beacons of its presence within radio visibility in order to activate them. The signal may consist only of a few bits for identifying the satellite and the message type. It is advantageously transmitted with a robust modulation and coding scheme and within a small bandwidth, thereby making it possible to benefit the link budget and to limit the energy consumption of the beacons monitoring this signal.

When they receive the signal, the beacons having data to transmit respond with an access request to access the radio resources. This is the case for the beacons 310 to 314. The access request comprises at least one identifier of the beacon. According to the embodiment, the beacons may be at a fixed location known to the satellite. Their position is then obtained from this identifier, for example in a correspondence table downloaded beforehand on board the satellite and updated when devices are introduced into/removed from the communication system. When they are moving or the satellite does not know their position, the beacons transmit this in the access request. They may advantageously also transmit information regarding the time at which the position was computed, and/or a history of the last positions. Lastly, the beacons may transmit information regarding the priority of their transmissions.

The identifier of the beacon makes it possible to recognize and to filter the beacons belonging to the communication system in order to provide a service only to them. According to the embodiment, this may also allow the satellite to obtain information about the type of beacon, in particular its emission capacities (beacon type/model, antenna type, emission power, possible modulation and coding schemes, size of the data packets, frequency bands, use of a data packet acknowledgement mechanism, etc.), always based on the identifier of the beacon and a correspondence table. This information makes it possible for example to establish a link budget. As an alternative, this information may be transmitted by the beacons in the access request.

When the data collection system comprises ground stations whose transmissions are multiplexed with the emissions of the beacons, the ground stations receiving the activation signal transmitted by the satellite also respond with an access request to access the radio resources. This request may contain only the identifier of the station when the position thereof and its transmission capacities are known to the satellite. When this is not the case, the identifier of the station and/or its transmission capacities may be transmitted in the access request.

The access requests are very short: they may therefore be emitted using an Aloha random access protocol. Advantageously, in order to avoid collisions, they may be emitted using a code-division spread-spectrum technique.

After a duration sufficient to ensure reception of all of the access requests, the data collection method according to the invention moves to the second phase 202. This second phase is implemented by the satellite based on the data received in the first phase of the method according to the invention.

First of all, the satellite receiving an access request may use the identifier of the beacon or of the ground station to determine whether or not it belongs to the communication system, in order to accept it or to reject it.

When the access request is accepted, the satellite uses the data that it contains to define (or update) a table grouping together all of the information obtained at the end of the first phase 201 of the method, and compute information relevant for implementing a transmission control plan.

In one minimal embodiment, in which the beacons do not have adjustable transmission means (frequency band, packet size, message sending duration, modulation and coding scheme, etc.), the information contained in the table may be limited to that described in Table 1:

TABLE 1

|  | Item of equipment 1 | Item of equipment 2 | Item of equipment 3 | ... |
| --- | --- | --- | --- | --- |
| Identifier |  |  |  |  |
| Type |  |  |  |  |
| Position |  |  |  |  |
| Direction |  |  |  |  |
| Duration of visibility |  |  |  |  |
| Allocated band |  |  |  |  |
| Allocated duration |  |  |  |  |

The field "Identifier" is obtained in the access request.

The field "Type" corresponds to the type of item of equipment that transmitted the access request: beacon or ground station, advantageously associated with the model of the item of equipment in order to create the link with its emission capacities. It is obtained from the access request or from a downloaded table based on the identifier of the item of equipment. This field is not necessary when the system does not comprise a ground station and/or the beacons all have the same emission capacities.

The field "Position" is obtained from the access request or from a downloaded table based on the identifier of the item of equipment.

The field "Direction" corresponds to the satellite-item of equipment directrix (angles $\theta'$ and $\varphi'$ with respect to the antenna axis), obtained from their respective positions.

The field "Duration of visibility" corresponds to the duration for which the item of equipment is visible to the satellite. The visibility window is obtained considering the direction of the item of equipment, the maximum depointing angle of the antenna of the satellite and its velocity vector.

The field "Allocated band" is linked to the type of beacon, and therefore obtained in the access request or in a downloaded table based on the identifier of the item of equipment.

The field "Allocated duration" is linked to the type of beacon, and therefore obtained in the access request or in a downloaded table based on the identifier of the item of equipment.

In various embodiments, Table 1 may be enriched with one or more parameters, shown in Table 2, which make it possible to improve the accuracy and the effectiveness of the method. Some of these parameters are linked to one another, and others may be implemented independently.

TABLE 2

|  | Item of equipment 1 | Item of equipment 2 | Item of equipment 3 | ... |
| --- | --- | --- | --- | --- |
| Identifier |  |  |  |  |
| Type |  |  |  |  |
| Position |  |  |  |  |
| Direction |  |  |  |  |
| Priority |  |  |  |  |

TABLE 2-continued

|  | Item of equipment 1 | Item of equipment 2 | Item of equipment 3 | ... |
| --- | --- | --- | --- | --- |
| Timestamp | | | | |
| History of positions | | | | |
| Velocity vector | | | | |
| Duration of visibility | | | | |
| Amount of data | | | | |
| Link budget | | | | |
| Modulation - Coding | | | | |
| Allocated band | | | | |
| Throughput | | | | |
| Allocated duration | | | | |
| Beam identifier | | | | |
| Acknowledgement | | | | |

The field "Priority" corresponds to the priority level of the transmission. It may be obtained in the access request or in a downloaded table based on the identifier of the item of equipment.

The field "Timestamp" corresponds to the time at which the position of the beacon was acquired. It is transmitted in the access request.

The field "History of positions" corresponds to the last positions acquired by the beacon, associated with a timestamp giving the time at which the measurement was performed. The history may be obtained in the access request, or be maintained by the satellite based on the positions recovered in previous iterations of the collection method.

The field "Velocity vector" corresponds to the velocity vector of the beacon, extrapolated from the history of the positions of the beacon, or transmitted in the access request. Advantageously, the satellite may know the maximum displacement velocity of the beacon so as to limit this value.

The field "Amount of data". In the case of a beacon, this field corresponds to the amount of data that the beacon must transmit to the satellite. It is obtained from the access request. In the case of a ground station, this field corresponds to the amount of data that the satellite must transmit to the ground station, obtained from the amount of data in memory in the satellite.

The field "Link budget" corresponds to the link budget between the satellite and the item of equipment under consideration. It is obtained from the distance between the satellite and the item of equipment, from the features of the item of equipment, such as its emission power and its antenna gain (obtained in the access request, from the model of the item of equipment or in a downloaded table based on the identifier of the item of equipment), and from the gain of the directional antenna of the satellite. It corresponds to the link budget margin.

The field "Modulation—Coding" corresponds to the modulation and coding scheme used to transmit data from the beacon to the satellite or from the satellite to the ground station. When it is fixed, it is obtained in the access request, from the model of the item of equipment, or in a downloaded table based on the identifier of the item of equipment. When it is dynamically adaptable, it is determined on the basis of the link budget, so as to be as effective as possible while at the same time guaranteeing good reception of the data.

The field "Allocated Band", when it is variable, is obtained from the amount of data to be transmitted, from the duration of visibility and from the modulation and coding scheme.

The field "Throughput", when it is fixed, is obtained in the access request, from the model of the item of equipment, or in a downloaded table based on the identifier of the item of equipment. When it is variable, it is given by the allocated bandwidth and the modulation and coding scheme.

The field "Allocated duration", when it is fixed, is obtained in the access request, from the model of the item of equipment, or in a downloaded table based on the identifier of the item of equipment. When it is variable, it is given by the amount of data to be transmitted and the throughput. This duration should be less than the duration of visibility of the satellite. When this is not the case, the modulation and coding scheme, the allocated frequency bandwidth or the amount of data to be transmitted may be modified, or the amount of data to be transmitted may be reduced.

When they are dynamically adaptable, the parameters "Allocated Bandwidth", "Modulation/Coding", "Throughput" and "Allocated Duration" are linked. They may therefore be adjusted jointly and recursively.

The field "Acknowledgement" indicates whether or not the transmissions are subject to an acknowledgement mechanism. This field is obtained in the access request or in a downloaded table based on the identifier of the item of equipment under consideration.

The data table filled in in the second phase 202 of the method contains all of the data useful for generating a transmission control plan for controlling the transmissions from the beacons, and to the ground stations when these are integrated into the collection system.

The method according to the invention then comprises a third phase 203 of defining an adaptive control plan based on the information recovered in the second phase 202 of the method.

The control plan schedules and orders the sequencing of the emissions from the beacons and to the ground stations, and associates them with an antenna configuration. This step is performed based on the information collected in the second phase of the method, in particular the duration of visibility of the beacons/ground stations and the transmission durations, such that a maximum number of transmissions are completed. Advantageously, the control plan also takes into account the priority level of the transmissions and the displacement of the beacons (expressed by their velocity vector).

Advantageously, the control plan may group together the transmissions within common beams. Specifically, a beam may serve multiple beacons when they are close enough and the available time and frequency resources are sufficient, thus optimizing pointing and facilitating beam switching operations. The beams are grouped within one and the same beam when they meet the following conditions:

they are located within a limited solid angle given by the width of the directional beam of the satellite. This information is able to be measured directly based on the direction information $\theta'$ and $\varphi'$, and possibly on the displacement of the satellite and the beacons, the duration of visibility and the frequency band that are allocated to the items of equipment is compatible with time multiplexing or frequency multiplexing of the transmissions.

The optimum beam direction of the directional antenna of the satellite $\theta$ and $\varphi$ is computed for each beam based on the position of the satellite at the time when the beam will be active, and when possible, on the displacement of the beacons. When the beam comprises multiple beacons, this direction is the one that optimizes the transmission and the duration of visibility for all of the beacons served by the beam.

When the antenna is an active antenna, the aperture angle of the antenna, that is to say the shape and the directivity of the antenna beam, may be adapted so as to optimize the duration of visibility of the items of equipment. In this case, it may be necessary to readjust the parameters, such as the modulation and coding scheme, the throughput, and the allocated band and duration. Likewise, when possible, the aperture of the antenna may be adjusted so as to allow beacons to be grouped together within one and the same beam, and/or to avoid transmissions performed by beacons not belonging to the communication system.

The control plan thus computed contains all of the information essential for implementing transmissions, grouped together for example in the form of a table, such as Table 3. Elements marked with an asterisk * are optional. The values that are indicated are given only by way of illustration.

TABLE 3

| Beam identifier | Beam 1 | Beam 2 | | Beam 3 |
|---|---|---|---|---|
| Number of items of equipment | 1 | 2 | | 1 |
| Identifier of the items of equipment | B4 | B1 | B2 | B3 |
| Order of service | 1 | 2 | | 3 |
| Type | Beacon | Beacon | Beacon | Beacon |
| Direction - Law A/φ | $\theta_1, \phi_1$ | $\theta_2, \phi_2$ | | $\theta_3, \phi_3$ |
| Allocated duration* | 2 sec | 2 sec | 2 sec | 1 sec |
| Allocated band* | All | Upper half | Lower half | All |
| Modulation/Coding* | BPSK 1/3 | QPSK ½ | QPSK ½ | QPSK ½ |
| Acknowledgement* | Yes | Yes | Yes | No |

The control plan formalizes the sequencing of the transmissions, associated with directions of the beam of the directional antenna of the satellite. At the very least, the elements that it contains are as follows:

the number of items of equipment per beam and their identifiers, the type of item of equipment (beacon or ground station) if the collection system comprises ground stations, the order of service, that is to say the temporal sequencing of the beams. As an alternative, the control plan may be organized depending on the order of service of the beams, as is the case in Table 3, the direction of the beam—law A/φ: in the case of a mechanically steerable antenna, the direction is given with respect to an optimum orientation of the directional beam of the antenna (θ, φ). In the case of an active antenna, this direction is reflected by a pointing law NT applied to the radiating elements of the antenna of the satellite. This law depends on the configuration of the antenna, on the direction of the beam and possibly on the aperture angle at 3 dB.

Advantageously, the control plan may also comprise one or more items of information including:

the duration allocated to the transmission, the band allocated to the transmission, when this is not fixed or when frequency multiplexing of the transmissions is possible, the modulation and coding scheme, the implementation of a data packet acknowledgement mechanism.

In the case given by way of illustration in Table 3, the beacons B1 and B2 are assigned the same duration in different frequency bands within the same beam. This therefore involves frequency multiplexing. The proportions of bands assigned to each of the beacons may be adjusted based on needs and/or on the basis of the priority levels of the transmissions. As an alternative, in the case of time multiplexing, the whole frequency band may be assigned successively to the two beacons.

The control plan established in the third phase 203 of the method according to the invention is adapted to the duration of visibility, to the priority and to the adaptation capacities of each item of equipment. It therefore makes it possible to optimize the capacity of the whole system. It may be updated again upon each iteration of the method.

The method according to the invention comprises a fourth phase 204 in which the transmissions defined in the control plan are performed.

The control plan must be communicated by the satellite to the various items of equipment located on the ground so that they transmit/receive in the time intervals that are assigned to them. Various methods are possible. A first method consists in transmitting it to all of the items of equipment at the end of each iteration of the third phase of the method 203, using the low directional antenna beam of the satellite. This embodiment minimizes the number of sending operations performed by the satellite, but requires good synchronization of the beacons. In a second method that is simpler to implement, the satellite sends the beacons a transmission request containing that information in the control plan that relates to this transmission when it is their turn to emit, using the corresponding directional antenna beam. The following description is based on this embodiment.

FIGS. 4a to 4d illustrate the sequence of the fourth phase of the method. First of all, illustrated in FIG. 4a, the satellite 301 forms the first directional beam listed in the control plan in the direction of the beacon 310. Using the directional beam that is formed, the satellite sends the beacon a transmission request, where applicable comprising information about the duration allocated to the transmission, the frequency band, the modulation and coding scheme, and/or the implementation of a data packet acknowledgement mechanism. In response to the transmission request, the beacon 310 sends its data to the satellite 301, which stores them.

Figure 4A:
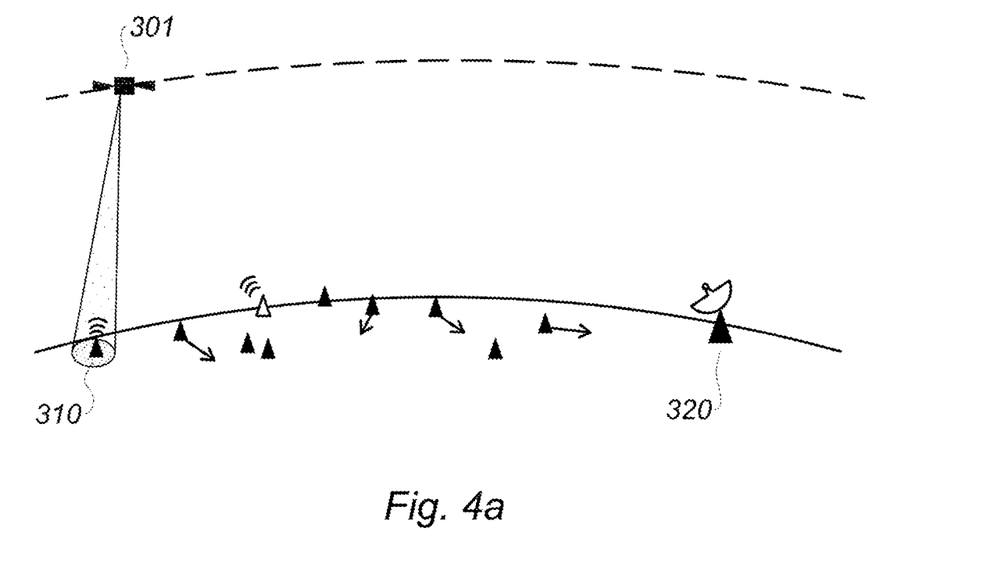
FIG. 4a uses one example to illustrate the start of the sequence of the fourth phase of one embodiment of the method according to the invention, continuing from FIG. 3.

When an acknowledgement mechanism is implemented, the data packets may for example be followed by an EoM (acronym for End of Message) field. When the satellite receives the EoM field at the end of a data packet, it saves the data and responds to the beacon 310 with an acknowledgement message. The beacon 310 may then erase the data from its memory. In the event of incomplete transmission (absence of an EoM field), the satellite schedules a new contact in the next iteration of the method for the rest of the data transmission. As an alternative, in the event of incorrect transmission, the satellite may transmit a lack of acknowledgement message to the beacon, which prepares to emit the packet in question again, and schedules a new contact in the next iteration of the method for a new transmission of the data. Advantageously, the data to be transmitted may be divided into data packets of sizes smaller than all of the data to be transmitted, each packet being terminated by an EoM field. This operating mode facilitates redispatching of the packets.

Figure 4B:
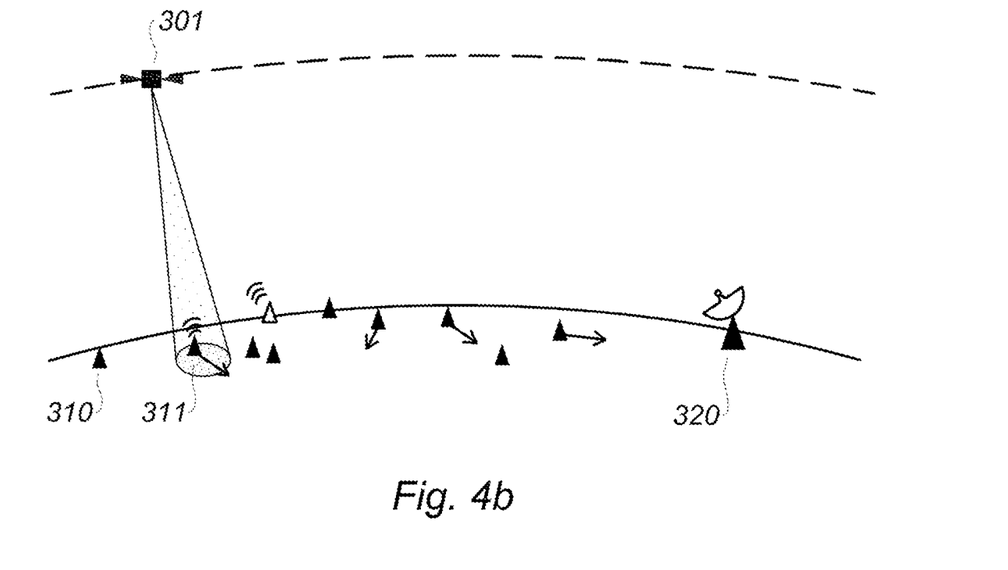

FIG. 4b shows the continuation of the fourth phase of the method according to one embodiment of the invention. Once the data of the beacon 310 have been recovered, the satellite modifies the direction of its directional beam so as to point it at the station 311 in accordance with the sequencing defined in the control plan. The displacement of the satellite since the first phase of the method is taken into account by the control plan, such that the beam of the directional antenna of the satellite is perfectly focused on the beacon 311 when it transmits. Furthermore, when the embodiment provides for this, the displacement of the beacon 311 is also taken into account. The satellite sends a transmission request to the beacon 311, which responds with the data to be transmitted, with or without an acknowledgement mechanism in accordance with the definition of the control plan.

Figure 4C:
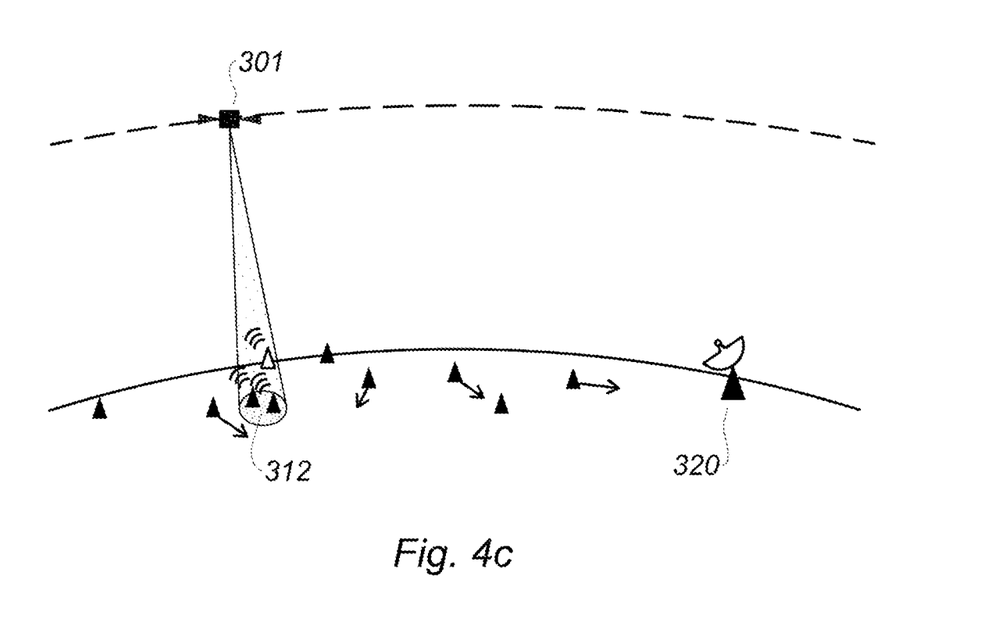
FIG. 4c uses one example to illustrate the continuation of the sequence of the fourth phase of one embodiment of the method according to the invention, continuing from FIG. 4b.

FIG. 4c shows the continuation of the fourth phase of the method according to one embodiment of the invention. The satellite 301 directs its directional beam so as to cover the two beacons denoted by the reference 312, grouped together within the same beam in accordance with the sequencing of the control plan. In the event of time multiplexing within the beam, the data transmission/request mechanism is implemented successively with each of the beacons before their emissions. In the event of frequency multiplexing, the satellite 301 transmits a request to the two beacons, which respond thereto simultaneously in the frequency band defined by the control plan.

Figure 4D:
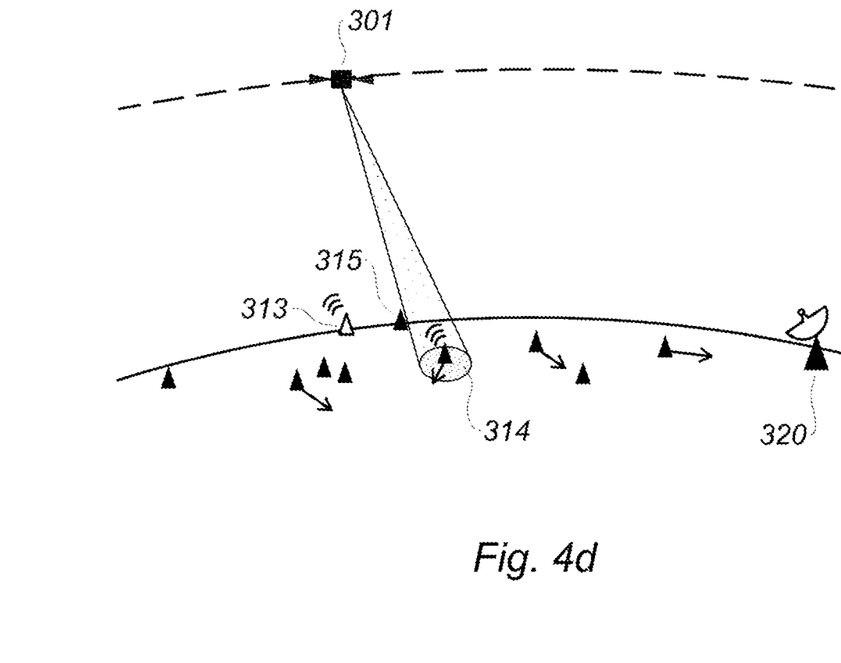
FIG. 4d uses one example to illustrate the continuation of the sequence of the fourth phase of one embodiment of the method according to the invention, continuing from FIG. 4c.

FIG. 4d shows the end of the fourth phase of the method according to one embodiment of the invention. In accordance with the control plan, the satellite directs its directional beam at the beacon 314, which has moved with respect to the position transmitted during the first phase 201 of the method. Advantageously, this displacement is anticipated by computing a velocity vector of the beacon in the second phase 202, and is taken into account when defining the control plan so as to orient the directional beam of the antenna at the beacon 314 as best possible. The transmission/request mechanism is then implemented with the beacon 314.

It is observed in particular that, in the method according to the invention, the beacon 315 that does not have data to transmit has not been called upon and has therefore not used energy to emit. The directional antenna beam was never oriented in the direction of the beacon 313, which does not belong to the communication system, thus naturally reducing interference linked to emissions of this beacon through the directivity of the antenna beam of the satellite. It is lastly observed that, for equal needs in terms of transmission and priority levels, the control plan first assigns the resources to the beacons having the shortest duration of visibility to the satellite.

Figure 5:
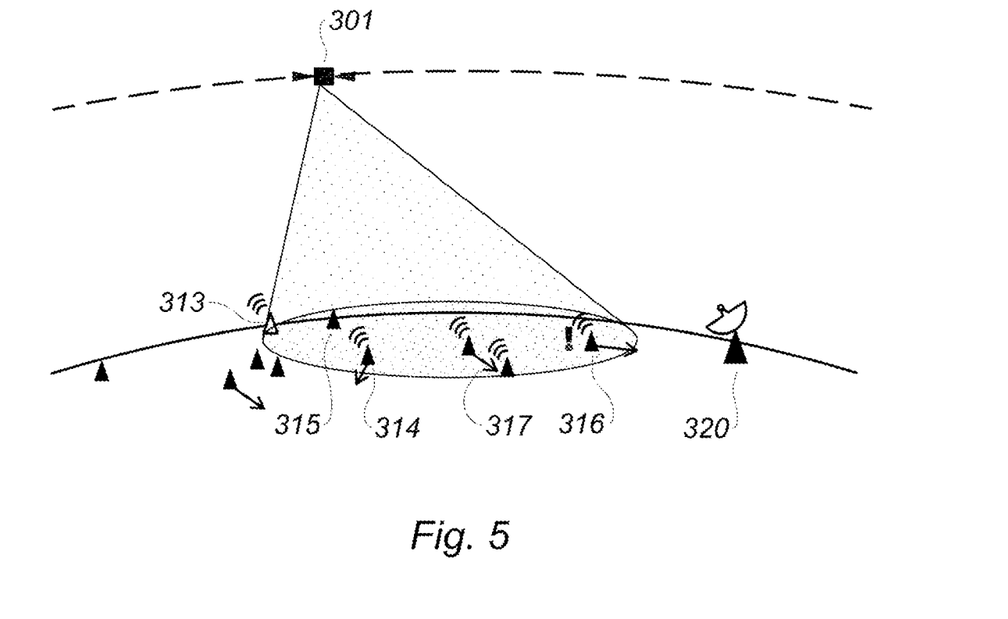
FIG. 5 uses one example to illustrate the first phase of a new iteration of one embodiment of the method according to the invention, continuing from FIG. 4d.

FIG. 5 shows the first phase of a new iteration of the data collection method according to the invention. Just as in FIG. 3, the satellite transmits a signal informing the beacons of its presence within radio visibility so as to activate them over a wide geographical area through its low directional antenna beam. This area comprises the beacon 313, which does not belong to the network, the beacon 314, which has new data to transmit, the beacon 315, which still does not have data to transmit, the beacon 316, having priority data to transmit, as well as the two beacons denoted by the reference 317, the two beacons having data to transmit, one of them moving.

At the end of this first phase, in which the various beacons respond with an access request when they have data to transmit, the second phase 202 of defining an information table regarding the items of equipment involved in future transmissions and the third phase 203 of defining a control plan are performed. The third phase takes into account the relative priority levels of the items of equipment, and therefore the beacon 316 will be served as a priority over the others, even though its duration of visibility is greater.

Figure 6A:
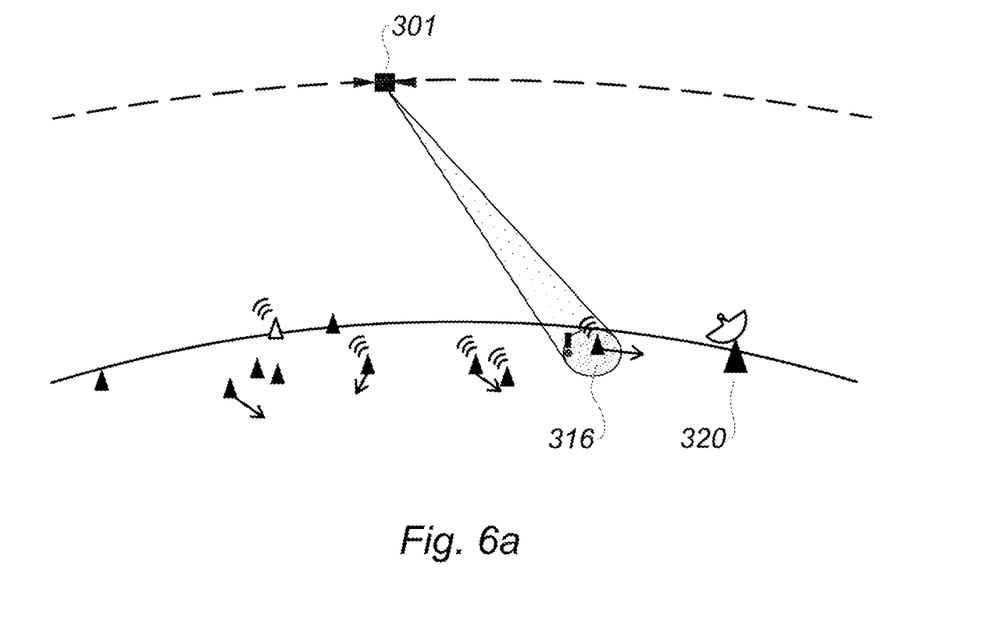
FIG. 6a uses one example to illustrate the start of the sequence of the fourth phase of one embodiment of the method according to the invention, continuing from FIG. 5.
Figure 6B:
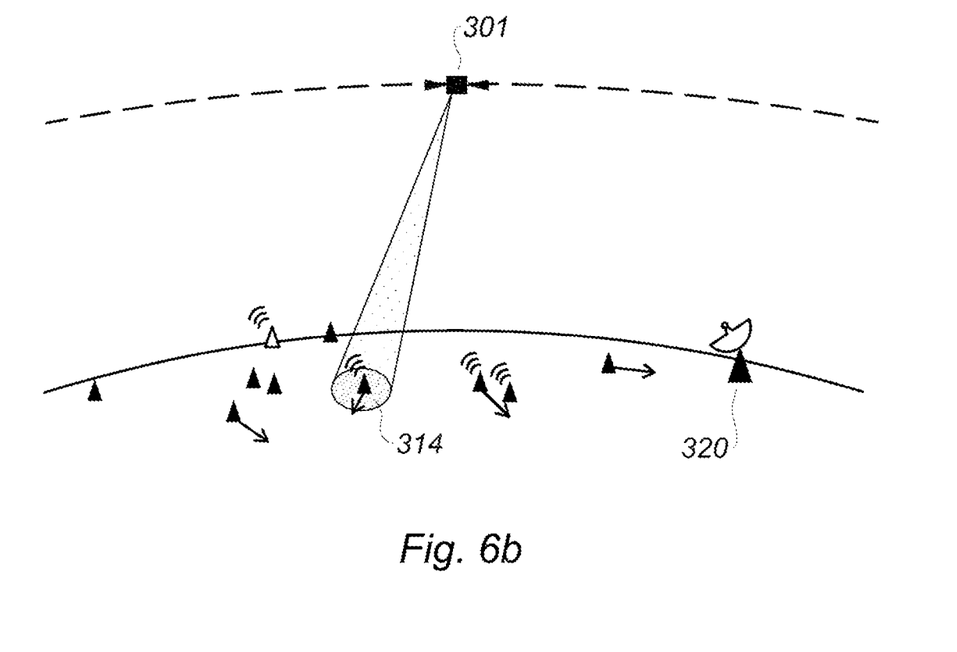
Figure 6C:
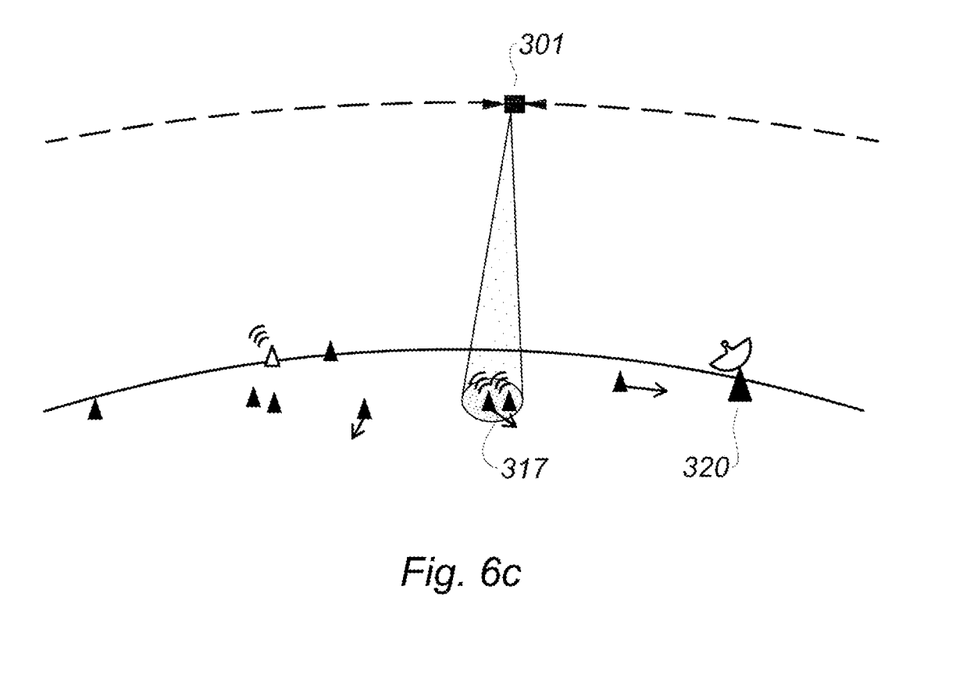
FIG. 6c uses one example to illustrate the continuation of the sequence of the fourth phase of one embodiment of the method according to the invention, continuing from FIG. 6b.

FIGS. 6a to 6c show the fourth phase of the second iteration of the method according to the invention.

As shown in FIG. 6a, the satellite 301 first of all positions its directional beam in the direction of the beacon 316 having the highest priority level, in accordance with the control plan. It transmits a transmission request, to which the beacon responds with its data, by implementing, where applicable, a data acknowledgement mechanism. In accordance with FIGS. 6b and 6c, the satellite then successively recovers the data transmitted by the beacon 314 and then by the beacons denoted by the reference 317 sharing the same beam.

When the data collection system does not involve ground stations, the steps described in connection with FIGS. 3 to 6c are iterated as needed.

Figure 7:
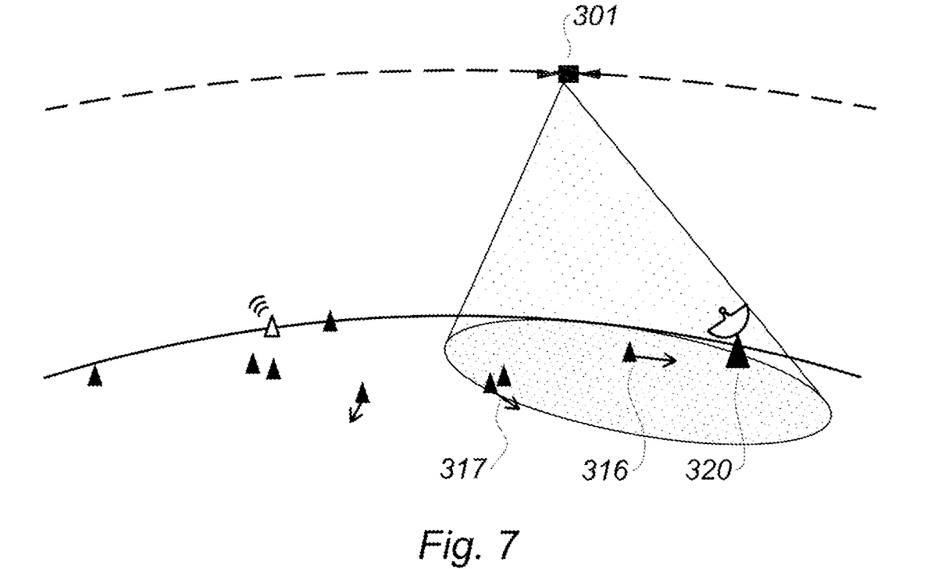
FIG. 7 uses one example to illustrate the first phase of a new iteration of one embodiment of the method according to the invention, continuing from FIG. 6c.

FIG. 7 shows the first phase of a new iteration of the data collection method according to one embodiment of the invention, when the data collection system involves one or more ground stations, and wherein the transmissions with the ground station take place via the same link as the transmissions from the beacons. The ground station 320 is located in the geographical area covered by the non-directional antenna beam of the satellite. In the first phase 201 of the method according to the invention, the satellite 301 emits a signal informing the beacons of its presence within radio visibility in order to activate them. The beacons having data to transmit and the ground station respond to this message. The ground station 320 is then considered in the computation of the control plan in the second phase 202 and the third phase 203 of the method.

When the link to the control station is provided by a separate data link, the signal transmitted by the satellite in the first phase of the method may be used to trigger reception from the ground station.

Figure 8:
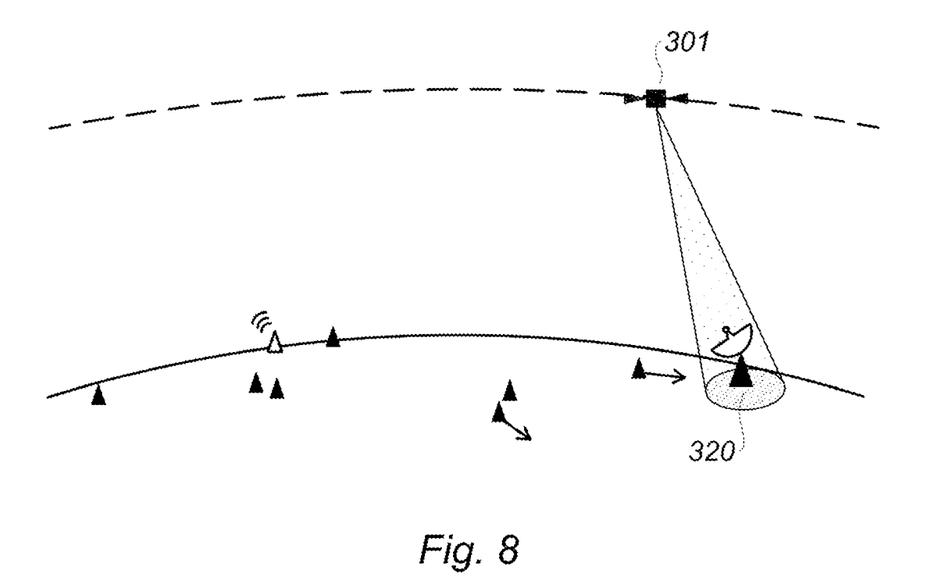
FIG. 8 uses one example to illustrate the fourth phase of a new iteration of one embodiment of the method according to the invention, continuing from FIG. 7.

FIG. 8 shows the fourth phase 204 of the third iteration of the method according to one embodiment of the invention. A slot is provided in the control plan for the satellite 301 to transmit the data stored in memory to the ground station 320 using its directional antenna beam.

Advantageously, the ground station may be treated as an item of equipment with maximum priority, so as to be the first one that is served, and such that all of the resources are dedicated thereto. This makes it possible to reduce latency between the sending of the data packets by the beacons and the reception thereof by the ground station, and to reduce the usage of the memory of the satellite as best possible.

The satellite erases the data stored in its memory once they have been transmitted. When the transmissions with the ground station implement an acknowledgement mechanism, the erasure takes place once the data have been acknowledged.

In one embodiment, the duration of the fourth phase 204 of the method according to the invention is variable. The satellite may then transmit all of the stored data to the ground station, provided that this is compatible with the duration of visibility of the two elements. In another embodiment, the duration of the fourth phase 204 of the method according to the invention is fixed. In this case, the satellite transfers to the ground station an amount of data that is limited by the allocated duration and the throughput of the link, preferably the oldest data.

The data collection method according to the invention, which implements a control plan for on-demand transmissions with the beacons and possibly the ground stations, exhibits numerous advantages over the prior art:

it does not call upon the beacons that do not have information to transmit, thereby allowing them to preserve their batteries;

it allows the satellite to use a directional antenna beam to receive the data transmitted by the beacons and send the data to the ground stations. This has the effect of benefiting the link budget, and therefore of improving the throughputs and the spectral efficiency of the transmissions when the items of equipment allow this, and therefore of improving the quality of the transmissions and the availability of the resources, and of reducing the emission durations of the beacons;

it makes it possible to organize the transmissions of the various items of equipment of the network, and to time-multiplex or frequency-multiplex them, thereby eliminating collisions between transmissions, avoiding retransmissions that are inherent to random-access techniques, guaranteeing access to the resources and making it possible to increase the number of items of equipment of the communication system;

it takes into account the duration of visibility of the items of equipment, given their position and, where applicable, their displacement, so as always to orient the beam of the satellite antenna as best possible;

it makes it possible to organize the transmissions on the basis of the priority level of the contained information;

it makes it possible to prevent the resources from being accessed by unregistered items of equipment, and to reduce possible interference caused by these items of equipment;

it is compatible with a transmitted packet acknowledgement mechanism;

it is not based on ephemerides with limited accuracy over the duration;

it is relatively simple to implement, and requires only a few signalling exchanges between the various items of equipment.

The method according to the invention therefore readily meets the stated technical need.

The invention also relates to a radiofrequency communication system as a whole, comprising at least one beacon (310, 311, 312, 314, 315) configured so as to acquire data and at least one space platform or airborne platform (301), such as a satellite or an aircraft having an antenna beam whose width and orientation are adaptable and comprising data storage means. It may also comprise one or more ground data collection stations (320). The various elements of the system comprise the computing means for implementing the various steps of the data collection method according to one embodiment of the invention.

The invention claimed is:

1. A data collection method for collecting data in a radiofrequency communication system comprising:
   at least one space platform or airborne platform that knows its position, configured so as to transmit with an antenna beam whose width and orientation are adaptable, and comprising data storage means, and
   at least one beacon configured so as to acquire data, the position of each beacon being known to at least one of said beacon and the space platform or airborne platform,
   the method comprising:
      a first step wherein the platform emits an activation signal with a low directional antenna beam, to which each beacon wishing to transmit data responds with an access request comprising an identifier,
      a second step of generating a table comprising, for each item of equipment that transmitted an access request, a duration of visibility to the transmission device, a frequency band and a transmission duration,
      a third step of defining, based on the table generated in the second step, a control plan scheduling the sequencing of the transmissions of the items of equipment that emitted an access request and associating them with directional antenna beam configurations of the platform, and
      a fourth step comprising:
         transmitting, to the items of equipment that emitted an access request, an item of information allowing them to ascertain the times at which they are able to transmit, and
         orienting a directional antenna beam from the platform to one or more beacons, sending data from said one or more beacons to the platform, and storing the data received by the platform, in the order and according to the antenna beam configurations defined by the control plan.

2. The data collection method according to claim 1, furthermore comprising at least one ground data collection station, wherein:
   the first step furthermore comprises transmission of an access request comprising an identifier by each ground station receiving the activation signal, and
   when a ground station transmits an access request during the first step of the method, the fourth step furthermore comprises transferring the data stored by the platform to the ground station with a directional antenna beam.

3. The data collection method according to claim 1, furthermore comprising at least one ground data collection station, the method furthermore comprising a step of transmitting the data stored by the platform to the ground station via a dedicated link.

4. The data collection method according to claim 1, wherein the access request emitted by a beacon in the first step furthermore comprises a position of the beacon and at least one of: an amount of data to be transmitted, a timestamp associated with said position, a priority level, a history of the positions of the beacon and an acknowledgement mechanism indicator.

5. The data collection method according to claim 1, wherein the access request emitted in the first step is modulated using a code-division spread-spectrum technique.

6. The data collection method according to claim 1, wherein the table generated in the second step furthermore comprises at least one of: a priority level, a velocity vector, an amount of data to be transmitted, a modulation and coding scheme, a throughput and an acknowledgement mechanism indicator.

7. The data collection method according to claim 1, wherein the control plan generated in the third step furthermore comprises at least one of: a number of items of equipment associated with each directional antenna beam configuration, an order of service, an allocated duration, an allocated frequency band, a modulation and coding scheme, and an acknowledgement mechanism indicator.

8. The data collection method according to claim 1, wherein the first three steps are repeated sequentially and wherein the fourth step is implemented in parallel with the first three steps.

9. The data collection method according to claim 1, wherein the four steps are repeated sequentially.

10. A radiofrequency communication system comprising:
    at least one space platform or airborne platform that knows its position, configured so as to transmit with an antenna beam whose width and orientation are adaptable and comprising data storage means, and at least one beacon configured so as to acquire data, the position of each beacon being known to at least one of said beacon and the space platform or airborne platform, the elements of the communication system being configured so as to implement a data collection method according to claim 1.

11. The radiofrequency communication system according to claim 10, furthermore comprising at least one ground data collection station.

12. The radiofrequency communication system according to claim 10, wherein the platform comprises an active antenna or a mechanically orientable antenna whose beam width is adjustable or a first antenna with a low directional beam and a second antenna with a mechanically orientable directional beam.

* * * * *